(12) United States Patent
Lowe et al.

(10) Patent No.: US 8,067,704 B2
(45) Date of Patent: Nov. 29, 2011

(54) SYSTEM AND METHOD FOR WEIGHING PARTICULATE MATERIAL MOVING ON A CONVEYOR

(75) Inventors: James Edwin Lowe, Stayner (CA); Andrew James Lowe, Stayner (CA); Kevin Dalton Lowe, Stayner (CA)

(73) Assignee: Equipfix, Stayner (CA)

( * ) Notice: Subject to any disclaimer, the term of this patent is extended or adjusted under 35 U.S.C. 154(b) by 341 days.

(21) Appl. No.: 12/369,396

(22) Filed: Feb. 11, 2009

(65) Prior Publication Data

US 2010/0059291 A1    Mar. 11, 2010

Related U.S. Application Data

(60) Provisional application No. 61/095,260, filed on Sep. 8, 2008.

(51) Int. Cl.
*G01G 11/00* (2006.01)
(52) U.S. Cl. .......................................... 177/16; 177/121
(58) Field of Classification Search .......... 177/119–122, 177/16
See application file for complete search history.

(56) References Cited

U.S. PATENT DOCUMENTS

| | | | | |
|---|---|---|---|---|
| 3,679,010 A * | 7/1972 | Bullivant | ......................... | 177/16 |
| 3,786,961 A * | 1/1974 | Wahl et al. | ...................... | 222/55 |
| 3,945,448 A * | 3/1976 | Sellers | ....................... | 177/25.19 |
| 4,418,773 A * | 12/1983 | Finet et al. | ...................... | 177/16 |
| 4,595,125 A * | 6/1986 | Alwerud | ........................ | 222/55 |
| 4,762,252 A * | 8/1988 | Hyer et al. | ....................... | 222/56 |
| 5,119,893 A * | 6/1992 | Jost | ................... | 177/16 |
| 5,696,354 A * | 12/1997 | Linville et al. | ................. | 177/119 |
| 5,802,674 A * | 9/1998 | Barber | ........................... | 19/105 |
| 6,437,255 B1 * | 8/2002 | Ludescher | ..................... | 177/16 |
| 6,545,231 B1 * | 4/2003 | Hafner | .......................... | 177/119 |
| 6,621,014 B1 * | 9/2003 | Tanner et al. | ................... | 177/121 |
| 6,964,550 B2 * | 11/2005 | Hafner | .......................... | 414/21 |
| 7,075,018 B1 * | 7/2006 | Scholz et al. | ................... | 177/16 |
| 7,622,686 B2 * | 11/2009 | Wolfschaffner | ................ | 177/16 |
| 7,750,253 B2 * | 7/2010 | Wineland | ........................ | 177/16 |

* cited by examiner

*Primary Examiner* — Randy W Gibson
(74) *Attorney, Agent, or Firm* — Stuart L. Wilkinson

(57) ABSTRACT

A system and method for weighing varying throughput of conveyed particulate material. The system has a weighing unit for measuring weight of material conveyed on a span of the conveyor and a speed monitoring unit to monitor the speed of the conveyor. A control module is programmed to calculate the instant value of material conveyed per unit length of the conveyor. An output from the control module reduces conveyor speed in response to a reduction in measured weight of material conveyed and increases conveyor speed in response to an increase in measured weight of material conveyed. High accuracy of measurement of the weight of particulate material being conveyed even when the conveyor is lightly loaded.

10 Claims, 3 Drawing Sheets

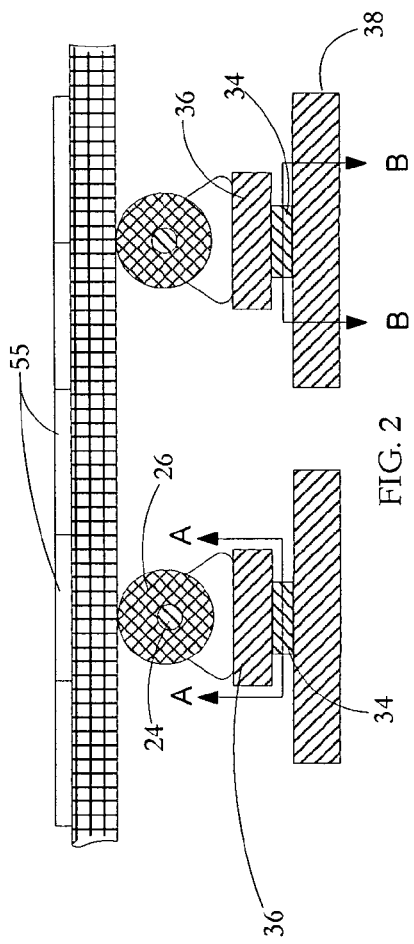
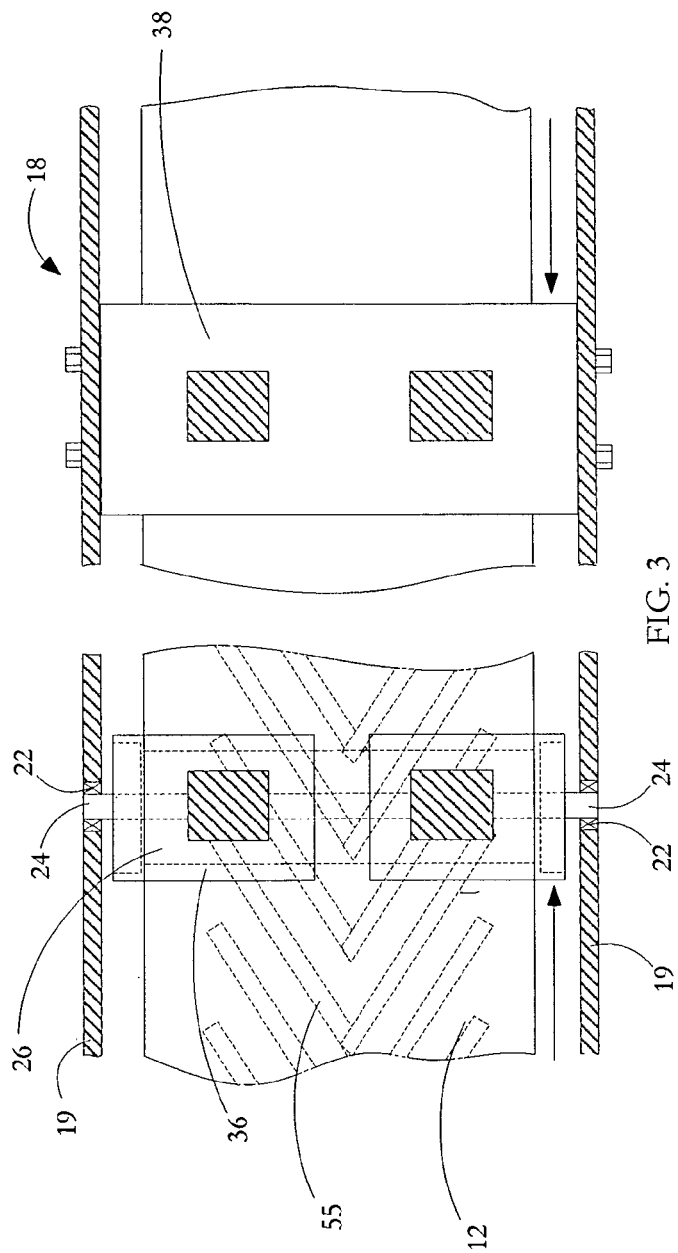
FIG. 2
FIG. 3

SYSTEM AND METHOD FOR WEIGHING PARTICULATE MATERIAL MOVING ON A CONVEYOR

CROSS REFERENCE TO RELATED PATENTS

The present application claims priority under 35 U.S.C. §119(e) from the provisional U.S. patent application Ser. No. 61/095,260 filed on Sep. 8, 2008 entitled "Conveyor Belt Scale For Weighing Varying Throughput" the contents of which are incorporated herein by reference thereto.

TECHNICAL FIELD OF THE INVENTION

This invention relates to a system and method for weighing particulate material such as sand and gravel as it is being moved by a conveyor such as a belt, chain, or bucket conveyor, and in particular to an arrangement for accurately weighing the particulate material when a light load is being conveyed.

DESCRIPTION OF RELATED ART

A description of principles involved in the operation of conveyors for particulate material is set out in the article, Application and Operating Principles of Conveyor Belt Scales by Richard D. Linville, Jr., Proceedings of the National Industrial Scale Association Spring and Fall Conferences of 2000, which is hereby incorporated by reference in its entirety. Typically, known conveyor weigh scale systems include one or more load cells, each cell mounted between a respective weigh plate supporting an idler roller and a base plate mounted to a support structure. The load cell is typically a compression load cell but can be a tension or shear load cell depending on the particular arrangement in which the load cell is used. Typically, such cells incorporate strain gauges but may be based on other types of transducer. One known type of conveyor weigh scale has four load cells with one pair of cells located near opposed ends of one idler roller shaft and the other pair located near opposed ends of a neighbouring idler roller shaft. As the conveyor passes over the load cell, an electrical output is developed corresponding to the instantly measured weight of particulate material acting on the load cell.

The output signals from the load cells are input to a signal processing module. Based on prior calibration, a combined value is generated at the signal processing module to represent the instant weight of particulate material conveyed by a discrete length of the belt. The combined signal value is measured periodically and a weight/time curve is obtained. The conveyed weight per unit length of belt is approximated from the weight curve using a suitable integrating module, such as a Riemann or Simpson's Rule processing module.

To measure the weight of particulate material conveyed over a period of time, the speed of the belt is also measured, typically using a rotary pulse generator such as an optical transmitter mounted on and rotating at the rate of rotation of an idler or driven roller and therefore at a rate proportional to the speed of the belt. A corresponding optical detector mounted on the support structure detects the optical pulses and converts them to an electrical output signal of magnitude corresponding to the speed of the belt. Other arrangements are known for measuring conveyor speed. For example, the pulse generator and detector combination can be a mechanical or magnetic device. In addition, the belt speed measuring arrangement can be based on detecting the time taken for a conveyor portion of the belt to pass linearly from one detection zone to a subsequent detection zone.

In such known arrangements, when there is only a low rate of flow of particulate material, it is difficult to obtain an accurate measure of the weight conveyed. To overcome this problem, belt operators are encouraged to avoid high speed, lightly loaded belts for scale applications. While this arrangement may be effective in maintaining weighing accuracy, it is not particularly convenient to use as it requires periodic monitoring to determine whether the belt conveyor appears to be heavily or lightly loaded. A method and apparatus are now proposed which offer such convenience.

SUMMARY OF THE INVENTION

According to one aspect of the invention, there is provided a conveyor weigh scale system for weighing conveyed particulate material, the system having a support structure, a weigh scale measuring unit for measuring weight of material conveyed on the conveyor, a speed monitoring unit to monitor the speed of the conveyor, a motor to drive the conveyor, and a control module to drive the motor, the control module having a first input thereto from the speed monitoring unit related to the speed of the conveyor, the control module having a second input from the weigh scale measuring unit related to the measured weight of material conveyed, the control module operable to reduce conveyor speed in response to a monitored reduction in measured weight of material conveyed and to increase conveyor speed in response to a monitored increase in measured weight of material conveyed.

The system can include a material input zone and a material output zone downstream of the input zone, the control module programmed to reduce and increase conveyor speed as required to maintain substantially constant the amount of particulate material per unit length of conveyor between the input and output zones. The control module can be programmed to maintain the conveyor speed above a predetermined threshold regardless of how lightly the conveyor is loaded so that even if no particulate material enters the input zone for a period of time, the conveyor does not come to a complete stop. The continued movement of the conveyor ensures that as soon as delivery of particulate material to the input zone starts up again, particulate material is conveyed to a weighing zone at which point the feedback loop operates.

According to another aspect of the invention, there is provided a method of weighing particulate material on a moving conveyor, the particulate material having varying throughput, the method comprising weighing the conveyed particulate material at the weighing zone over a span of the conveyor, reducing conveyor speed in response to a reduction in measured weight of material conveyed and increasing conveyor speed in response to an increase in measured weight of material conveyed. Preferably the method further comprises inputting particulate material to an input zone of the conveyor and outputting particulate material from an output zone of the conveyor downstream of the input zone, and reducing and increasing conveyor speed as required to maintain substantially constant the amount of particulate material per unit length of conveyor between the input and output zones. The method can further comprise maintaining the conveyor speed above a predetermined threshold regardless of how lightly the conveyor is loaded so that even if no particulate material enters the input zone for a period of time, the conveyor does not halt.

A system embodying the invention can be used in a fixed, permanent installation or can alternatively be constructed as a mobile, high accuracy weighing unit transportable to locations where accurate weighing is required of particulate material being conveyed. A signal processing and control module can be programmed to convey a predetermined amount of particulate material e.g. a truckload, following the application of a start signal. Alternatively, or in addition, the control module is programmed to print out a record showing weight of material conveyed between application of start and stop signals.

Automated reduction of the conveyor speed at lower flow rates, and increase of the conveyor speed at higher flow rates, enables enhanced weighing accuracy and enhanced weighing resolution where the weight of particulate material delivered and conveyed to the conveyor changes over time. The invention is applicable to any sort of material conveyor where weighing accuracy and resolution are a problem owing to reduced, hard-to-measure throughput of the conveyor. Thus, for example, the invention may find application in belt, chain or bucket conveyors.

BRIEF DESCRIPTION OF THE DRAWINGS

It will be appreciated that for simplicity and clarity of illustration, elements illustrated in the following figures have not necessarily been drawn to scale. For example, the dimensions of some of the elements are exaggerated relative to other elements for clarity. Advantages, features and characteristics of the present disclosure, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 2 is a sectional view to a larger scale showing a part of the conveyor system of FIG. 1.

FIG. 3 is a sectional view of the scrap view of FIG. 2 but showing in the left part of the FIG. a cross-sectional view from below on the line A-A of FIG. 2 and showing in the right hand part of the FIG. a cross-sectional view from above on the line B-B of FIG. 2.

DETAILED DESCRIPTION OF PREFERRED EMBODIMENTS OF THE INVENTION

Figure 1:
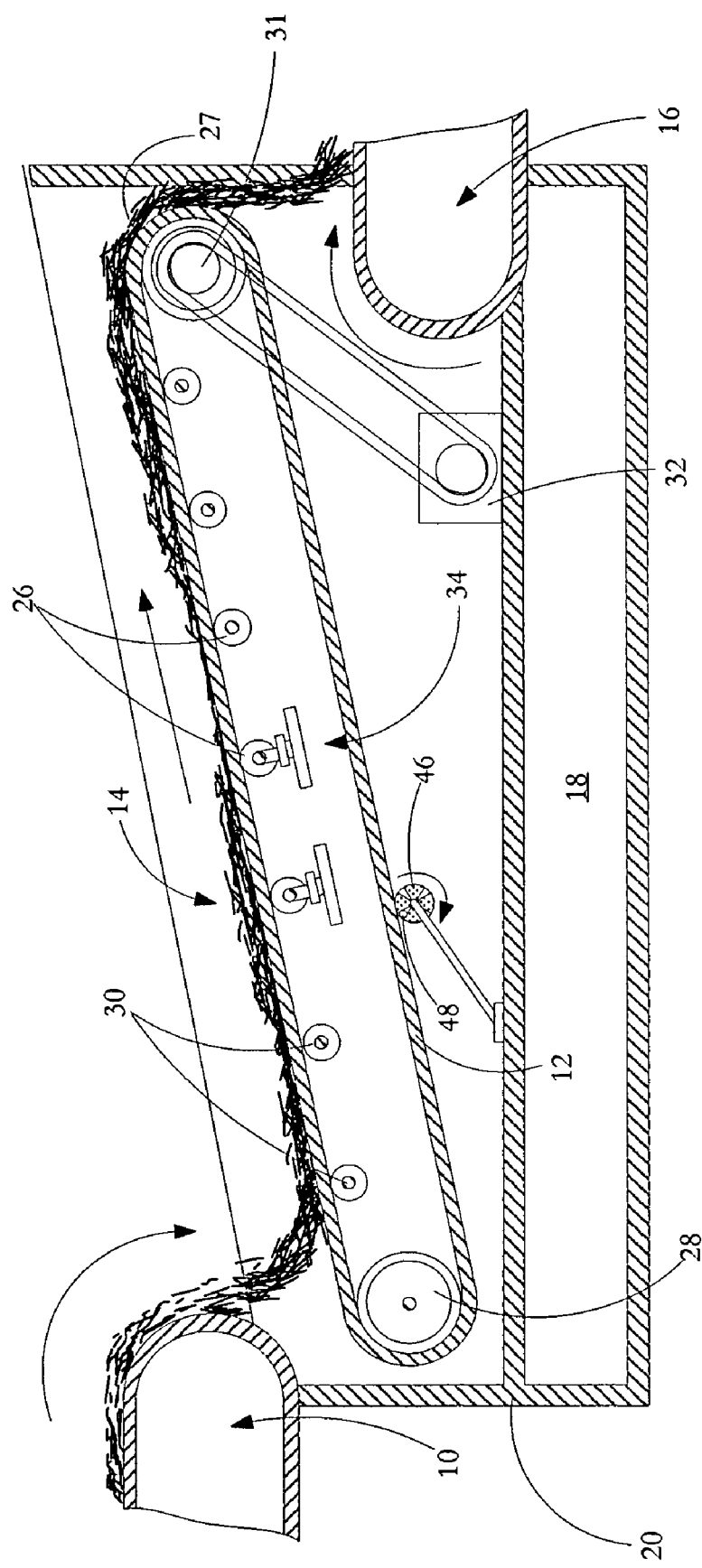
FIG. 1 is a sectional view of a conveyor system according to one embodiment of the invention.

Referring to FIG. 1, there is shown a conveyor weigh scale system 14 for conveying particulate material such as sand or gravel. A feeder belt sub-system 10 delivers particulate material onto an input end of an endless belt 12 forming one part of the system 14. The belt conveys the particulate material to an output end of the belt where the material falls from the belt onto an extractor belt sub-system 16 which takes the material to a destination such as a truck or stockpile.

The conveyor weigh scale system includes a structural frame 18 having side walls 19 and end walls 20. As shown in FIGS. 2 and 3, in the side walls 19 are mounted bearings 22. Shafts 30 extend between pairs of bearings, the shafts supporting idler rollers 26. The system has end rollers 27, 28 and idler rollers 30 with the endless belt 12 extending between the end rollers and tensioned therebetween. The idler rollers 30 are equally spaced between the end rollers 27, 28 and have parallel axes of rotation, so acting to maintain a top span of the belt in a single plane.

A drive pulley 31 is mounted on the shaft supporting the end roller 27 so as to enable a drive to be applied to the roller 27. The drive mechanism includes a 3-phase induction motor 32 with a continuously variable drive whereby the speed of the belt can be adjusted to any value within a desired range by altering the current supplied to the motor. The size, rating and other operating characteristics of the motor 32 are chosen to match the particular demands of the weigh belt sub-system including the expected loaded weight of the weigh belt, its operating speed range, acceleration and deceleration range, angle of inclination, etc.

The illustrated system has four load cells 34, each load cell mounted between a weigh plate 36 supporting an idler roller 30 and a base plate 38 mounted to the support structure 18. The load cells 34 are compression load cells but can alternatively be tension or shear cells depending on the particular application. The load cells incorporate strain gauge transducers but can alternatively incorporate other types of transducer. The cells of one pair of load cells are mounted at opposed ends of a first idler roller shaft 30 and the cells of the other pair are mounted at opposed ends of a neighbouring idler roller shaft. A single or other array of load cells can be used as an alternative to the four cell arrangement.

Figure 4:
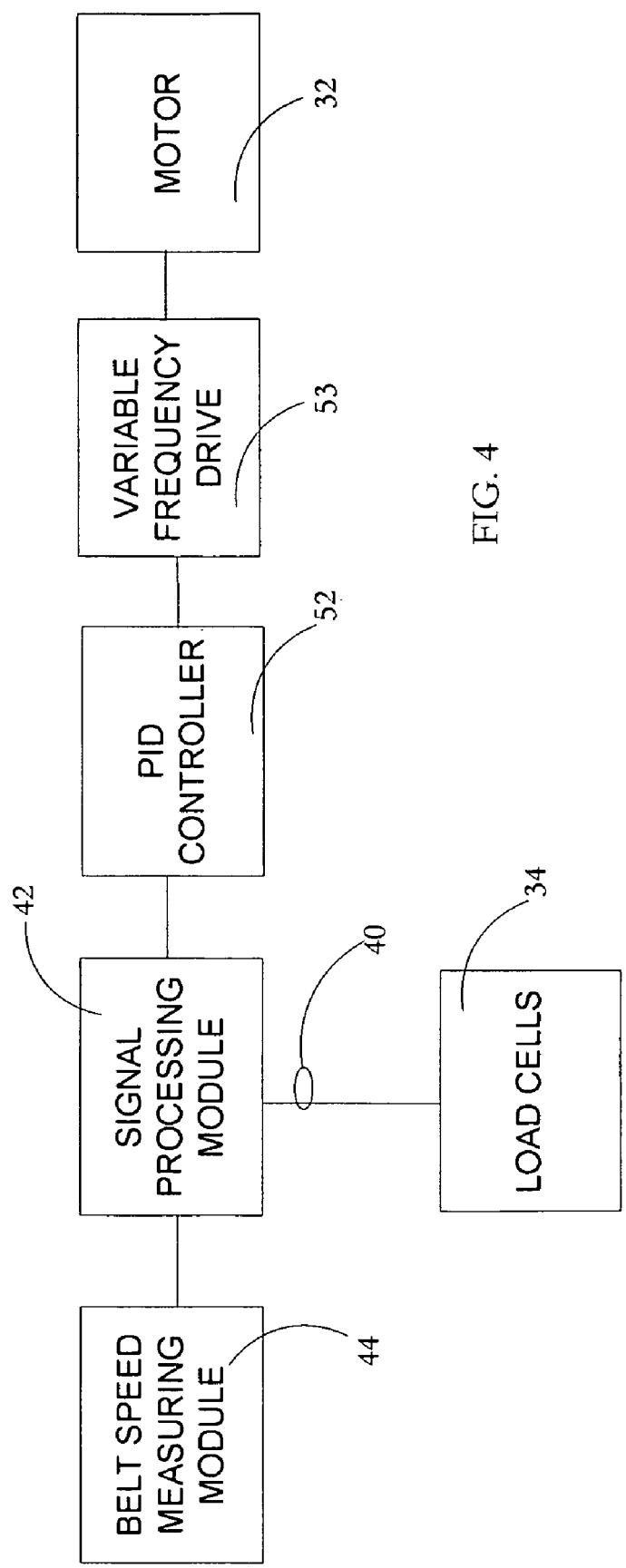
FIG. 4 is a circuit schematic view of a control module for a conveyor weigh scale system according to an embodiment of the invention.

As shown in the circuit schematic view of FIG. 4, components of the weight of particulate material being measured are detected at each of the load cells and converted into corresponding output signals 40. The output signals are processed at a signal processing module 42. Based on prior calibration, the instant weight of particulate material conveyed by an overlying span of the belt 12 is computed at the module. The instant weight is measured periodically and a weight/time curve is derived. The conveyed weight per unit length of the belt is approximated from the weight/time curve by applying an integrating function at the signal processing module such as a Riemann or Simpson's Rule approximation.

The system also includes a belt speed measuring module 44. As shown in FIG. 1, the belt speed measuring module includes a slotted disc 46 mounted on the support structure and biased against the interior surface of the belt. The module also includes an optical source 48 which directs a light beam towards the disc and an optical detector (not shown) which detects a light pulse when a slot on the rotating disc passes in front of the source. The detected pulse rate is directly proportional to the belt speed and the disc and slot dimensions are selected so that a pulse is detected every one eighth of an inch of belt movement. The detector output is taken to the signal processing module 42 which computes an instant value of the belt speed. Other arrangements can be used to measure the speed of the belt. For example, the transmitter/detector combination can be a mechanical or magnetic device. In addition, the belt speed measuring arrangement can alternatively measure the time taken for a portion of the belt to pass from one detection zone to a subsequent detection zone.

The belt speed and the weight per unit length values are processed at the signal processing module 42 to calculate the weight of material conveyed by the belt over a period of time. A corresponding output is directed to a proportional integral derivative (PID) controller 52 which produces a corresponding change in a 4-20 mA analog output signal used to control a variable frequency drive module 53 to change the current supplied to the 3 phase induction motor 32 powering the drive pulley 31. As the amount of material conveyed by the belt increases, this is detected by the weigh scale and, in response, the belt speed is increased so as to maintain a constant load percentage. Conversely, as the load feed rate drops, this is detected by the weigh scale and, in response, the belt speed is reduced to maintain the constant load percentage. The accuracy of the weigh scale is dependent upon the belt speed changing in accordance with the volume of material on the belt.

The signal processing module includes an internal routine which detects when the weight of conveyed material delivered to the input of the conveyor falls below a predetermined minimum. The routine ensures that the conveyor continues to move in spite of the belt weight falling below the threshold. Consequently, even if no particulate material enters the input zone for a period of time, the conveyor does not come to a complete stop. The continued movement of the conveyor ensures that as soon as delivery of particulate material to the input zone starts up again, particulate material is conveyed to the weighing zone at which point the signal processing module proceeds to generate the weight dependent output.

The signal processing module can be programmed to drive the conveyor to convey a specific desired weight of particulate material following a start signal and then to stop, and also to generate a corresponding output signal to a control module of a supply conveyor to prevent delivery of further particulate material to the conveyor weigh scale system from the supply conveyor until the system is reset. The processing module can also be programmed to output a signal to a printer or display function for issuing, on demand, a weighed material indication as a printout or display.

It will be understood that systems embodying the invention can be constructed to include features associated with conventional conveying systems. For example, a conveying system according to the invention can include means for adjusting conveyor inclination. Using the weigh scale of the invention, the weight registered by a load cell of particulate material conveyed on an inclined belt would be less than the weight registered by the load cell if the same amount of particulate material were being conveyed by a level belt. To compensate for belt inclination, one embodiment of the invention includes a belt inclination sensor attached to the belt system to measure the angle of inclination of the belt, the sensor providing a further input to the signal processing module to compensate for the selected belt inclination.

It is important that neither the conveyor nor conveyed particulate material be subjected to forces which might introduce error into the weighing operation. Many conventional belt conveyors have contoured or inclined rollers to cause the belt to adopt a slightly channeled profile across its width whereby conveyed particulate material is directed towards the centre of the belt and so prevented from spilling from the belt. If used with the present invention, such a structure may cause lateral force to be applied to the load cells so altering their response. To avoid a spurious weighing result arising from these lateral forces, the idler rollers immediately adjacent the weigh span zone are closely spaced with their axes horizontal which accurately maintains the belt in a single plane. Weighing error may also be introduced if particulate material scrapes along the surface of skirting boards which are conventionally sited at outer edges of the belt to prevent spillage. To reduce the chance of inaccuracy, the weigh span zone is constructed without skirting boards. Using these arrangements, other means are adopted to prevent the particulate material from spilling off the belt. In one such means, as shown in FIG. 3, raised chevron formations 55 are formed on the outer surface of the endless belt 12, the chevrons orientated in relation to the direction of movement of the belt so as to tend to drive conveyed particulate material inwardly towards the apexes of the chevron formations. Other ways of compensating for laterally applied forces will be apparent to those skilled in the art.

It will be understood that a conveyor arrangement constructed according to the invention can provide a very accurate dispensing capability. In an embodiment of the invention, the weigh scale system is constructed as a mobile unit which is pre-calibrated and which driven or transported to a permanent or semi-permanent site where it can be installed in a conveyor run to provide accurate measurement of conveyed particulate material. The mobile unit can be wheeled for trailing or can be a tractor unit. Alternatively, the mobile unit can be provided with heavy duty suspension lugs allowing the unit to be lifted on or off a flat bed unit to be taken to remote sites.

Although the invention has been described in terms of conveyors for materials such as sand and gravel, the invention has application to handling other materials such as powders, flakes, fibres, pellets, chunks and contained liquids, and the term "particulate materials" as used in this specification is intended to cover all such conveyed materials. Automated reduction of the conveyor speed at low flow rates and increased conveyor speed at high flow rates enables enhanced weighing accuracy and enhanced weighing resolution where the weight of particulate material delivered to the conveyor changes over time. The invention is applicable to any sort of material conveyor where weighing accuracy and resolution are a problem owing to reduced, hard-to-measure throughput of the conveyor.

What is claimed is:

1. A conveyor weigh scale system for weighing varying throughput of conveyed particulate material, the system having a weighing unit for measuring weight of material conveyed on the conveyor, a speed monitoring unit for measuring the speed of the conveyor, a motor to drive the conveyor, and a control module, the control module having a first input from the conveyor speed monitoring unit, a second input from the weighing unit, and an output to a motor control module to reduce conveyor speed in response to a reduction in measured weight of material conveyed and to increase conveyor speed in response to an increase in measured weight of material conveyed.

2. A conveyor weigh scale system as claimed in claim 1, the conveyor having a particulate material input zone and a particulate material output zone downstream of the input zone, the control module programmed to reduce and increase conveyor speed as required to maintain substantially constant the amount of particulate material per unit length of conveyor between the input and output zones.

3. A conveyor system as claimed in claim 2, the control module programmed to maintain the conveyor speed above a predetermined threshold whereby, absent particulate material at the input zone for a period of time, the conveyor is not halted, and in response to subsequent delivery of particulate material at the input zone, the delivered particulate material is conveyed by the conveyor to the weighing unit and weighed at the weighing unit, and said second input is generated dependent upon the weighed, conveyed material.

4. A conveyor system as claimed in claim 1, the system constructed as a pre-calibrated mobile unit for installation in a conveyor run.

5. A system as claimed in claim 1, the control module programmed to convey a predetermined amount of particulate material following the application of a start signal.

6. A system as claimed in claim 1, the control module having an output to at least one of a printer and a display, the control module programmed to input to the at least one of a printer and display a signal indicating weight of particulate material conveyed between application of start and stop signals.

7. A system as claimed in claim 1, the conveyor system being one of a belt conveyor, a chain conveyor and a bucket conveyor.

8. A method of weighing particulate material on a moving conveyor, the particulate material having varying throughput, the method comprising weighing the conveyed particulate material at a weighing zone over a span of the conveyor, reducing conveyor speed in response to a reduction in measured weight of material conveyed and increasing conveyor speed in response to an increase in measured weight of material conveyed.

9. A method as claimed in claim 8, further comprising inputting particulate material to an input zone of the conveyor and outputting particulate material from an output zone of the conveyor downstream of the input zone, and maintaining the conveyor speed above a predetermined threshold regardless of how lightly the conveyor is loaded so that even if no particulate material enters the input zone for a period of time, the conveyor does not halt.

10. A method as claimed in claim 9, further comprising reducing and increasing conveyor speed as required to maintain substantially constant the amount of particulate material per unit length of conveyor between the input and output zones.

\* \* \* \* \*